United States Patent
Mallik et al.

(10) Patent No.: US 10,542,556 B2
(45) Date of Patent: Jan. 21, 2020

(54) MODULATION AND CODING SCHEME (MCS) AND/OR RANK SELECTION IN COORDINATED MULTI-POINT (COMP) COMMUNICATION

(71) Applicant: QUALCOMM Incorporated, San Diego, CA (US)

(72) Inventors: Siddhartha Mallik, San Diego, CA (US); Anastasios Stamoulis, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/709,086

(22) Filed: Sep. 19, 2017

(65) Prior Publication Data

US 2018/0092110 A1    Mar. 29, 2018

Related U.S. Application Data

(60) Provisional application No. 62/398,915, filed on Sep. 23, 2016.

(51) Int. Cl.
*H04W 88/02* (2009.01)
*H04W 72/12* (2009.01)
(Continued)

(52) U.S. Cl.
CPC ....... *H04W 72/1226* (2013.01); *H04L 5/0057* (2013.01); *H04L 5/0073* (2013.01);
(Continued)

(58) Field of Classification Search
CPC . H04W 72/1226; H04W 88/02; H04W 88/08; H04W 72/12; H04W 72/1263;
(Continued)

(56) References Cited

U.S. PATENT DOCUMENTS

2012/0044849 A1*  2/2012  Farmanbar ............. H04B 7/024
                                                            370/312
2016/0127911 A1*  5/2016  Yiu ....................... H04L 5/0073
                                                            455/447

FOREIGN PATENT DOCUMENTS

EP              2612533 A1       7/2013

OTHER PUBLICATIONS

International Search Report and Written Opinion—PCT/US2017/052495—ISA/EPO—dated Dec. 11, 2017.
(Continued)

*Primary Examiner* — Chuong A Ngo
(74) *Attorney, Agent, or Firm* — Patterson & Sheridan, LLP

(57) ABSTRACT

Certain aspects of the present disclosure provide techniques for MCS and/or rank selection for UE jointly served by BSs in a CoMP cluster. As described herein, MCS and/or rank selection may be based, at least in part, on the inter-cluster interference and intra-cluster interference experienced by the UE. According to aspects, a CoMP scheduler may assign a UE served by BSs in a CoMP cluster to one of a first group of UEs or a second group of UEs based, at least in part, on inter-cluster and intra-cluster interference experienced by the UE. The scheduler may assign at least one of a MCS or rank selection to the UE based, at least in part, on the assigned group. The scheduler may provide an indication, to one or more BSs in the CoMP cluster, of the at least one MCS or rank selection assigned to the UE.

30 Claims, 11 Drawing Sheets

(51) Int. Cl.
*H04L 5/00* (2006.01)
*H04L 27/26* (2006.01)
*H04W 88/08* (2009.01)

(52) U.S. Cl.
CPC ......... *H04L 27/2601* (2013.01); *H04W 88/02* (2013.01); *H04W 88/08* (2013.01)

(58) Field of Classification Search
CPC ... H04L 5/0035; H04L 5/0096; H04L 5/0057; H04L 27/2601; H04L 5/0073; H04L 5/0062; H04B 7/024
See application file for complete search history.

(56) References Cited

OTHER PUBLICATIONS

Tokyo Institute of Technology et al: "Distributed Dynamic CoMP for LTE-Advanced (Revision from R1-093608)", 3GPP Draft; R1-094285—Distributed Dynamic Comp for LTE Advanced (Revised from R1-093608) (Tokyotech and KDDI), 3rd Generation Partnership Project (3GPP), Mobile Competence Centre ; 650, Route Des Lucioles ; F-06921 Sophia-Antipolis Cedex; France, No. Miyazaki; Oct. 12, 2009, Oct. 12, 2009 (Oct. 12, 2009), XP050388747, pp. 1-22, [retrieved on Oct. 11, 2009].

* cited by examiner

MODULATION AND CODING SCHEME (MCS) AND/OR RANK SELECTION IN COORDINATED MULTI-POINT (COMP) COMMUNICATION

CROSS-REFERENCE TO RELATED APPLICATIONS

This application claims priority to U.S. Provisional Application Ser. No. 62/398,915, entitled "MODULATION AND CODING SCHEME (MCS) AND/OR RANK SELECTION IN COORDINATED MULTI-POINT (CoMP) COMMUNICATION," filed on Sep. 23, 2016, which is expressly incorporated herein by reference in its entirety.

INTRODUCTION

Aspects of the present disclosure relate to wireless communications systems, and more particularly, to assigning a modulation and coding scheme (MCS) and/or rank selection to one or more user equipments (UEs) served by multiple geographically separated base stations (BSs).

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency divisional multiple access (SC-FDMA) systems, and time division synchronous code division multiple access (TD-SCDMA) systems.

In some examples, a wireless multiple-access communication system may include a number of base stations, each simultaneously supporting communication for multiple communication devices, otherwise known as user equipment (UEs). In LTE or LTE-A network, a set of one or more base stations may define an eNodeB (eNB). In other examples (e.g., in a next generation or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., a new radio base station (NR BS), a new radio node-B (NR NB), a network node, 5G NB, gNB, gNodeB, etc.). A base station or DU may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. An example of an emerging telecommunication standard is new radio (NR), for example, 5G radio access. NR is a set of enhancements to the LTE mobile standard promulgated by Third Generation Partnership Project (3GPP). It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

However, as the demand for mobile broadband access continues to increase, there exists a need for further improvements in NR technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Techniques for partitioning UEs, by a coordinated multipoint (CoMP) scheduler, into one of two groups based, at least in part, on interference experienced by the UE are described herein. Based at least on the assigned group, a scheduler may assign a MCS and/or rank selection for use by multiple BSs while communicating with the UE as described herein. Rank may refer to layers used or a number of different data streams to be transmitted simultaneously on the same time and frequency resources to a UE.

In an aspect, a method for wireless communication by a coordinated multipoint (CoMP) scheduler is provided. The method generally includes assigning a user equipment (UE) served by multiple base stations (BSs) in a CoMP cluster to one of a first group of UEs or a second group of UEs based, at least in part, on inter-cluster and intra-cluster interference experienced by the UE, assigning at least one of a modulation and coding scheme (MCS) or rank selection to the UE based, at least in part, on the assigned group, and providing an indication, to one or more of the multiple BSs in the CoMP cluster, of the at least one MCS or rank selection assigned to the UE.

In an aspect, an apparatus for wireless communication by a coordinated multipoint (CoMP) scheduler is provided. The apparatus generally includes means for assigning a user equipment (UE) served by multiple base stations (BSs) in a CoMP cluster to one of a first group of UEs or a second group of UEs based, at least in part, on inter-cluster and intra-cluster interference experienced by the UE, means for assigning at least one of a modulation and coding scheme (MCS) or rank selection to the UE based, at least in part, on the assigned group, and means for providing an indication, to one or more of the multiple BSs in the CoMP cluster, of the at least one MCS or rank selection assigned to the UE.

In an aspect, an apparatus for wireless communication by a coordinated multipoint (CoMP) scheduler is provided. The apparatus includes at least one processor an a memory coupled to the at least one processor. The at least one processor is configured to assign a user equipment (UE) served by multiple base stations (BSs) in a CoMP cluster to one of a first group of UEs or a second group of UEs based, at least in part, on inter-cluster and intra-cluster interference experienced by the UE, assign at least one of a modulation and coding scheme (MCS) or rank selection to the UE based, at least in part, on the assigned group, and provide an indication, to one or more of the multiple BSs in the CoMP cluster, of the at least one MCS or rank selection assigned to the UE.

In an aspect, a computer readable medium for wireless communication by a coordinated multipoint (CoMP) scheduler is provided. The computer readable medium has computer-executable instructions stored thereon for assigning a user equipment (UE) served by multiple base stations (BSs) in a CoMP cluster to one of a first group of UEs or a second group of UEs based, at least in part, on inter-cluster and intra-cluster interference experienced by the UE, assigning at least one of a modulation and coding scheme (MCS) or rank selection to the UE based, at least in part, on the assigned group, and providing an indication, to one or more of the multiple BSs in the CoMP cluster, of the at least one MCS or rank selection assigned to the UE.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
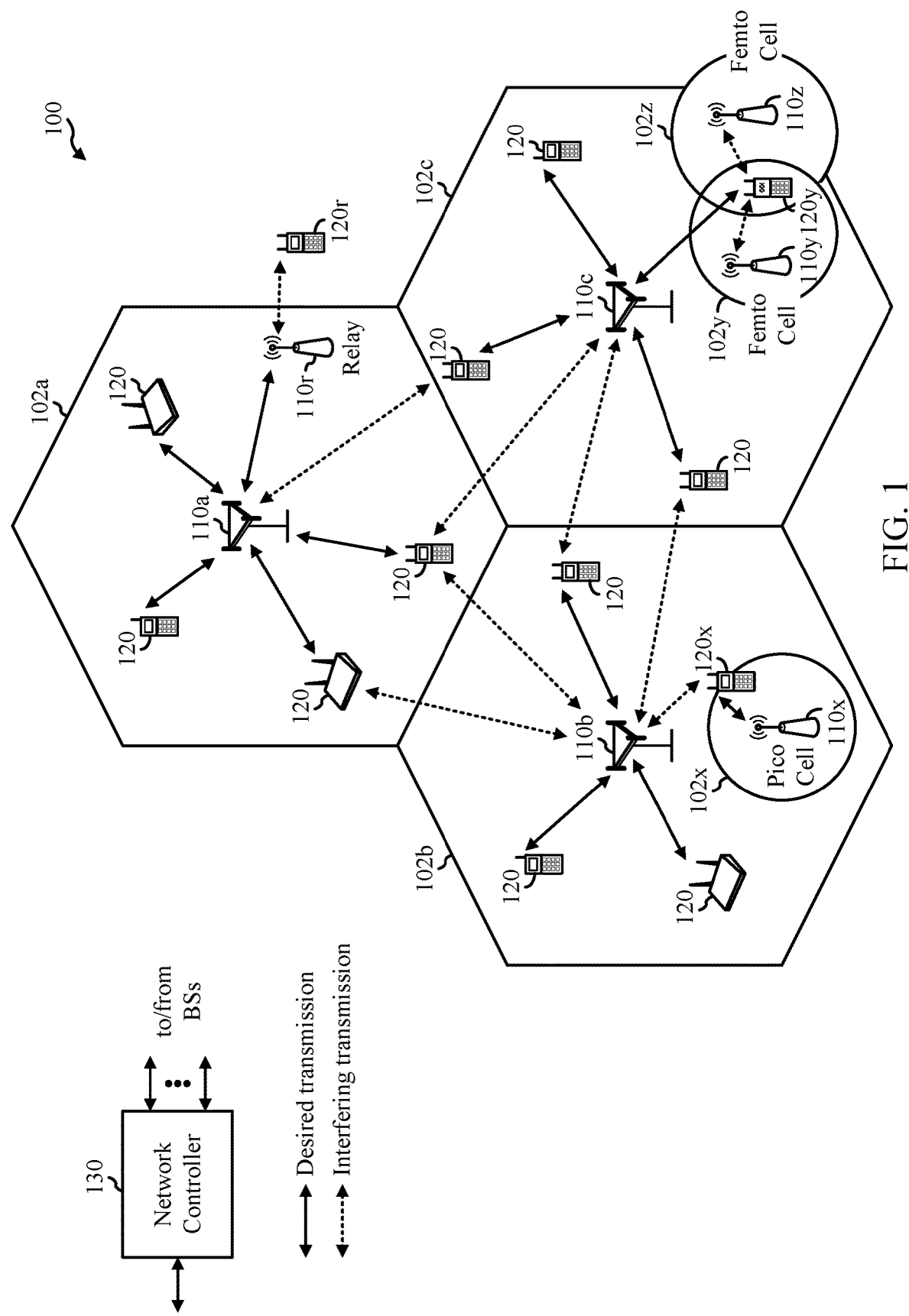
FIG. 1 is a block diagram conceptually illustrating an example telecommunications system, in accordance with certain aspects of the present disclosure.

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as universal terrestrial radio access (UTRA), cdma2000, etc. UTRA includes wideband CDMA (WCDMA), time division synchronous CDMA (TD-SCDMA), and other variants of CDMA. cdma2000 covers IS-2000, IS-95 and IS-856 standards. A TDMA network may implement a radio technology such as global system for mobile communications (GSM). An OFDMA network may implement a radio technology such as evolved UTRA (E-UTRA), ultra mobile broadband (UMB), IEEE 802.11 (Wi-Fi), IEEE 802.16 (WiMAX), IEEE 802.20, Flash-OFDM®, etc. UTRA and E-UTRA are part of universal mobile telecommunication system (UMTS). 3GPP Long Term Evolution (LTE) and LTE-Advanced (LTE-A), in both frequency division duplex (FDD) and time division duplex (TDD), are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies, including New Radio (NR) technologies. For clarity, certain aspects of the techniques are described below for LTE/LTE-Advanced, and LTE/LTE-Advanced terminology is used in much of the description below. LTE and LTE-A are referred to generally as LTE.

Some examples of UEs may include cellular phones, smart phones, personal digital assistants (PDAs), wireless modems, handheld devices, tablets, laptop computers, netbooks, smartbooks, ultrabooks, medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium. Some UEs may be considered evolved or enhanced machine-type communication (eMTC) UEs. MTC and eMTC UEs include, for example, robots, drones, remote devices, such as sensors, meters, monitors, location tags, etc., that may communicate with a base station, another device (e.g., remote device), or some other entity. A wireless node may provide, for example, connectivity for or to a network (e.g., a wide area network such as Internet or a cellular network) via a wired or wireless communication link.

It is noted that while aspects may be described herein using terminology commonly associated with 3G and/or 4G wireless technologies, aspects of the present disclosure can be applied in other generation-based communication systems, such as 5G and later.

An example of an emerging telecommunication standard is new radio (NR), for example, 5G radio access. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL) as well as support beamforming, multiple-input multiple-output (MIMO) antenna technology, and carrier aggregation.

NR is an example of a millimeter-wave (mmWave) communication system, which brings gigabit speeds to cellular networks, due to availability of large amounts of bandwidth. The unique challenges of heavy path-loss faced by millimeter-wave systems necessitate new techniques such as hybrid beamforming (analog and digital), which are not present in 3G and 4G systems. Hybrid beamforming may enhance link budget/signal to noise ratio (SNR) that may be exploited to improve wireless communication.

Spectrum bands in high frequencies (e.g., 28 GHz, may be referred to as mmWave) provide large bandwidths capable of delivering multi-Gbps data rates, as well as extremely dense spatial reuse which may increase capacity. Traditionally, these higher frequencies were not robust enough for indoor/outdoor mobile broadband applications due to high propagation loss and susceptibility to blockage (e.g., from buildings, humans, and the like).

Despite these challenges, at the higher frequencies, small wavelengths enable a large number of antenna elements in a relatively small form factor. Unlike microwave links, which may cast very wide footprints, reducing the achievable amount of reuse of the same spectrum within a geographical area, mmWave links cast very narrow beams. This characteristic of mmWave may be leveraged to form directional beams that may send and receive more energy to overcome propagation and path loss challenges.

These narrow directional beams can also be utilized for spatial reuse. This is one of the key enablers for utilizing mmWave for mobile broadband services. In addition, the non-line-of-site (NLOS) paths (e.g., reflections from nearby building) can have very large energies, providing alternative paths when line-of-site (LOS) paths are blocked.

With more antenna elements and narrow beams, it becomes increasingly vital to transmit signals in the appropriate direction, in an effort to maximize the received signal energy at the UE.

Example Wireless Communications System

FIG. 1 illustrates an example wireless network 100 in which aspects of the present disclosure may be performed. For example, the wireless network may be new radio or 5G network. The NR network may include the central unit 130. According to aspects and as will be described in more detail herein, multiple BSs 110 (e.g., Node Bs, TRPs, APs) may communicate with a UE using a downlink strategy called joint processing. For example, in CoMP communication, multiple BSs may be geographically separated and may coordinate to create beams, where each beam may be transmitted from the multiple BSs to a UE. BSs that participate in the joint processing for downlink communication to a UE may be referred to as a cluster of BSs.

A CoMP scheduler may facilitate joint processing by the multiple BSs of the CoMP cluster to a UE. A scheduler may be part of one of the BSs within the cluster. Additionally or alternatively, the scheduler may be separate from the BSs of the cluster. The scheduler may communicate with one or more BSs of the cluster. Thus, a CoMP scheduler may be part of the BS 110 and/or may be part of a separate entity such as, for example, a network controller 130. The CoMP scheduler may be configured to perform the operations 1100 and 1200 and the methods discussed in more detail herein.

FIG. 1 illustrates an example wireless network 100 in which aspects of the present disclosure may be implemented. For example, the wireless network may be a new radio (NR) or 5G network or and LTE network.

As illustrated in FIG. 1, the wireless network 100 may include a number of BSs 110 and other network entities. A BS may be a station that communicates with UEs. Each BS 110 may provide communication coverage for a particular geographic area. In 3GPP, the term "cell" can refer to a coverage area of a Node B and/or a Node B subsystem serving this coverage area, depending on the context in which the term is used. In NR systems, the term "cell" and gNB, Node B, 5G NB, AP, NR BS, NR BS, or TRP may be interchangeable. In some examples, a cell may not necessarily be stationary, and the geographic area of the cell may move according to the location of a mobile base station. In some examples, the base stations may be interconnected to one another and/or to one or more other base stations or network nodes (not shown) in the wireless network 100 through various types of backhaul interfaces such as a direct physical connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a frequency channel, etc. Each frequency may support a single RAT in a given geographic area to avoid interference between wireless networks of different RATs. In some cases, NR or 5G RAT networks may be deployed.

A BS may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BS for the femto cells 102y and 102z, respectively. A BS may support one or multiple (e.g., three) cells.

The wireless network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

The wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

The wireless network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another, e.g., directly or indirectly via wireless or wireline backhaul. As described herein, according to aspects, the network controller 130 may include a CoMP scheduler, which communications and coordinates Node Bs within a cluster.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered evolved or machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices.

In FIG. 1, a solid line with double arrows indicates desired transmissions between a UE and a serving BS, which is a BS designated to serve the UE on the downlink and/or uplink. A dashed line with double arrows indicates interfering transmissions between a UE and a BS.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a 'resource block') may be 12 subcarriers (or 180 kHz). Consequently, the nominal FFT size may be equal to 128, 256, 512, 1024 or 2048 for system bandwidth of 1.25, 2.5, 5, 10 or 20 megahertz (MHz), respectively. The system bandwidth may also be partitioned into subbands. For example, a subband may cover 1.08 MHz (i.e., 6 resource blocks), and there may be 1, 2, 4, 8 or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR.

NR may utilize OFDM with a CP on the uplink and downlink and include support for half-duplex operation using TDD. A single component carrier bandwidth of 100 MHz may be supported. NR resource blocks may span 12 sub-carriers with a subcarrier bandwidth of 75 kHz over a 0.1 ms duration. In one aspect, each radio frame may consist of 50 subframes with a length of 10 ms. Consequently, each subframe may have a length of 0.2 ms. In another aspect, each radio frame may consist of 10 subframes with a length of 10 ms, where each subframe may have a length of 1 ms. Each subframe may indicate a link direction (i.e., DL or UL) for data transmission and the link direction for each subframe may be dynamically switched. Each subframe may include DL/UL data as well as DL/UL control data. UL and DL subframes for NR may be as described in more detail below with respect to FIGS. 6 and 6a. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based. NR networks may include entities such CUs and/or DUs.

In some examples, access to the air interface may be scheduled, wherein a scheduling entity (e.g., a base station) allocates resources for communication among some or all devices and equipment within its service area or cell. Within the present disclosure, as discussed further below, the scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. That is, in some examples, a UE may function as a scheduling entity, scheduling resources for one or more subordinate entities (e.g., one or more other UEs). In this example, the UE is functioning as a scheduling entity, and other UEs utilize resources scheduled by the UE for wireless communication. A UE may function as a scheduling entity in a peer-to-peer (P2P) network, and/or in a mesh network. In a mesh network example, UEs may optionally communicate directly with one another in addition to communicating with the scheduling entity.

Thus, in a wireless communication network with a scheduled access to time-frequency resources and having a cellular configuration, a P2P configuration, and a mesh configuration, a scheduling entity and one or more subordinate entities may communicate utilizing the scheduled resources.

As noted above, a RAN may include a CU and DUs. A NR BS (e.g., gNB, 5G Node B, Node B, transmission reception point (TRP), access point (AP)) may correspond to one or multiple BSs. NR cells can be configured as access cells (ACells) or data only cells (DCells). For example, the RAN (e.g., a central unit or distributed unit) can configure the cells. DCells may be cells used for carrier aggregation or dual connectivity, but not used for initial access, cell selection/reselection, or handover. In some cases DCells may not transmit synchronization signals—in some case cases DCells may transmit SS. NR BSs may transmit downlink signals to UEs indicating the cell type. Based on the cell type indication, the UE may communicate with the NR BS. For example, the UE may determine NR BSs to consider for cell selection, access, handover, and/or measurement based on the indicated cell type.

Figure 2:
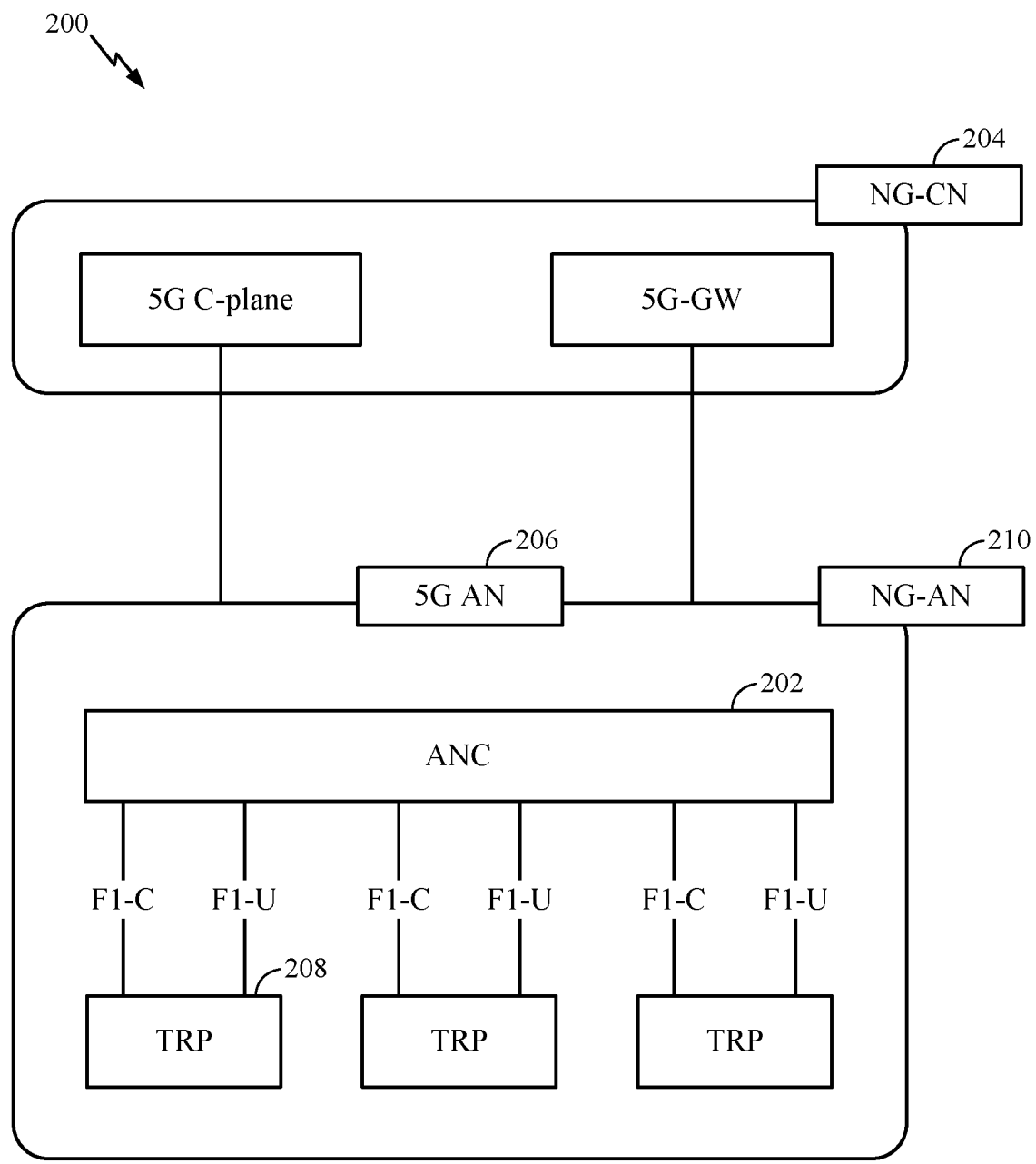
FIG. 2 is a block diagram illustrating an example logical architecture of a distributed RAN, in accordance with certain aspects of the present disclosure.

FIG. 2 illustrates an example logical architecture of a distributed radio access network (RAN) 200, which may be implemented in the wireless communication system illustrated in FIG. 1. A 5G access node 206 may include an access node controller (ANC) 202. The ANC may be a central unit (CU) of the distributed RAN 200. The backhaul interface to the next generation core network (NG-CN) 204 may terminate at the ANC. The backhaul interface to neighboring next generation access nodes (NG-ANs) may terminate at the ANC. The ANC may include one or more TRPs 208 (which may also be referred to as BSs, NR BSs, Node Bs, 5G NBs, APs, or some other term). As described above, a TRP may be used interchangeably with "cell."

The TRPs 208 may be a DU. The TRPs may be connected to one ANC (ANC 202) or more than one ANC (not illustrated). For example, for RAN sharing, radio as a service (RaaS), and service specific AND deployments, the TRP may be connected to more than one ANC. A TRP may include one or more antenna ports. The TRPs may be configured to individually (e.g., dynamic selection) or jointly (e.g., joint transmission) serve traffic to a UE.

The local architecture 200 may be used to illustrate fronthaul definition. The architecture may be defined that support fronthauling solutions across different deployment types. For example, the architecture may be based on transmit network capabilities (e.g., bandwidth, latency, and/or jitter).

The architecture may share features and/or components with LTE. According to aspects, the next generation AN (NG-AN) 210 may support dual connectivity with NR. The NG-AN may share a common fronthaul for LTE and NR.

The architecture may enable cooperation between and among TRPs 208. For example, cooperation may be preset within a TRP and/or across TRPs via the ANC 202. According to aspects, no inter-TRP interface may be needed/present.

According to aspects, a dynamic configuration of split logical functions may be present within the architecture 200.

As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU or CU (e.g., TRP or ANC, respectively). According to certain aspects, a BS may include a central unit (CU) (e.g., ANC 202) and/or one or more distributed units (e.g., one or more TRPs 208).

Figure 3:
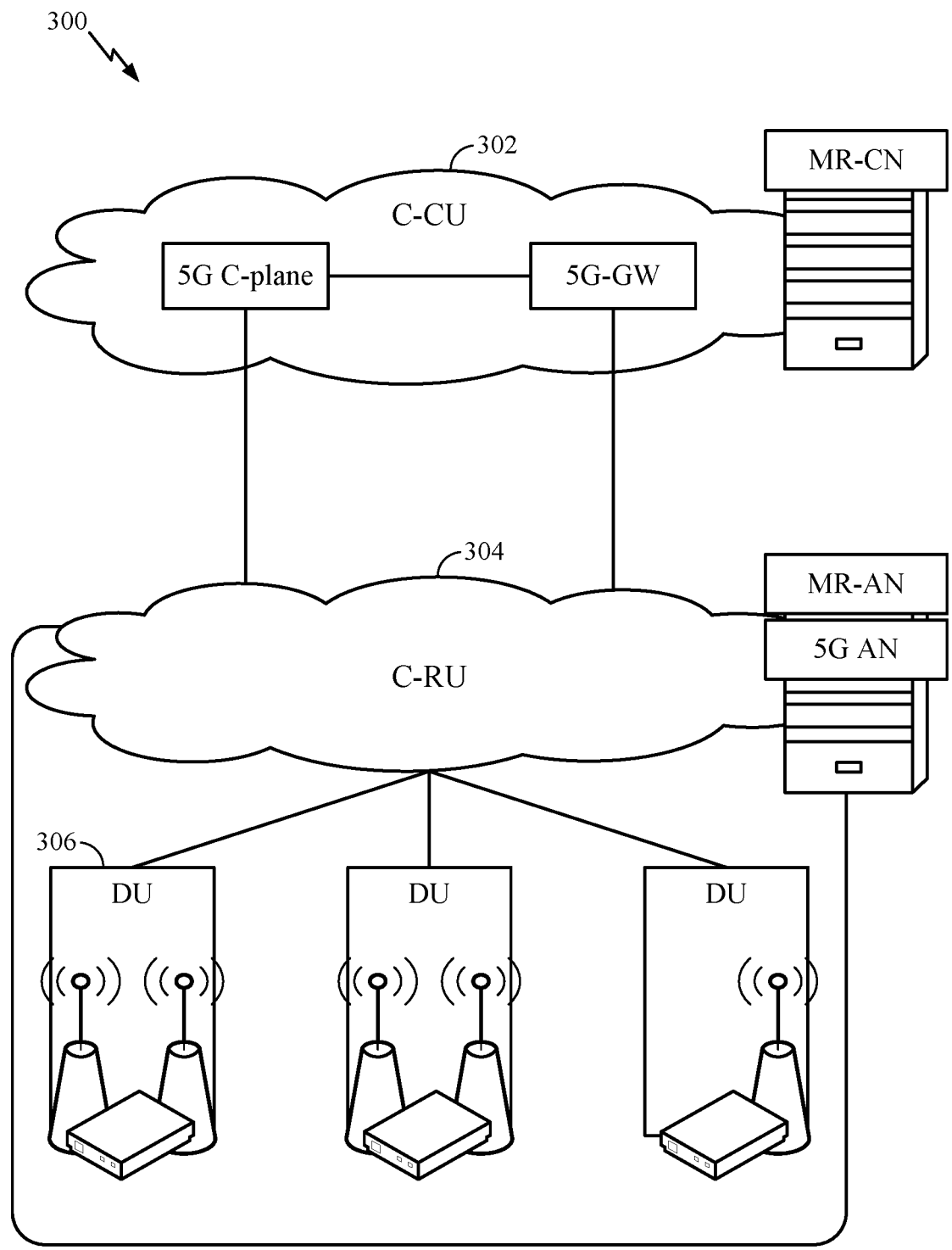
FIG. 3 is a diagram illustrating an example physical architecture of a distributed RAN, in accordance with certain aspects of the present disclosure.

FIG. 3 illustrates an example physical architecture of a distributed RAN 300, according to aspects of the present disclosure. A centralized core network unit (C-CU) 302 may host core network functions. The C-CU may be centrally deployed. C-CU functionality may be offloaded (e.g., to advanced wireless services (AWS)), to handle peak capacity.

A centralized RAN unit (C-RU) 304 may host one or more ANC functions. Optionally, the C-RU may host core network functions locally. The C-RU may have distributed deployment. The C-RU may be closer to the network edge.

A DU 306 may host one or more TRPs (edge node (EN), an edge unit (EU), a radio head (RH), a smart radio head (SRH), or the like). The DU may be located at edges of the network with radio frequency (RF) functionality.

Figure 4:
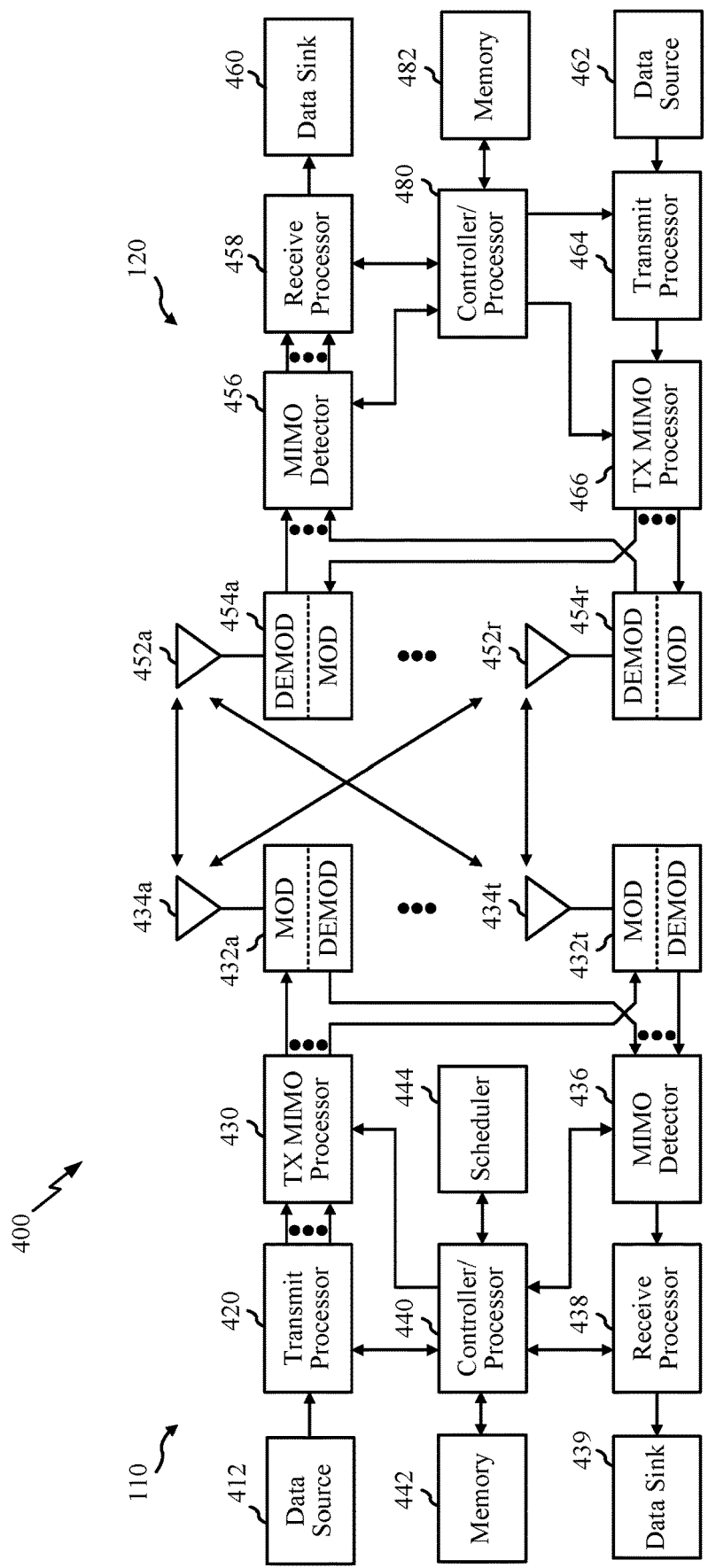
FIG. 4 is a block diagram conceptually illustrating a design of an example BS and UE, in accordance with certain aspects of the present disclosure.

FIG. 4 illustrates example components of the base station 110 and UE 120 illustrated in FIG. 1, which may be used to implement aspects of the present disclosure. One or more components of the BS 110 may be used to practice aspects of the present disclosure. For example, the BS may include a CoMP scheduler. In such cases, the antennas 434, mod/demod 432 processors 430, 420, 438, and/or controller/processor 440 may be used to perform the operations described herein and illustrated with reference to FIG. 11 and FIG. 12.

According to aspects, the CoMP scheduler may be external to the one or more BSs of a CoMP cluster. In the case where the CoMP scheduler is a separate entity from the BS 110, for example, part of the network controller 130 in FIG. 1, the CoMP scheduler may include components similar to the BS 110 as illustrated in FIG. 4. The scheduler may be in communication (wireless and/or wired) with the one or more BSs of the CoMP cluster. In such cases, one or more processors, transceivers (mod/demod), and antennas, in combination with a memory configured to store instructions thereon at the scheduler may be configured to perform the features described herein.

FIG. 4 shows a block diagram of a design of a BS 110 and a UE 120, which may be one of the BSs and one of the UEs in FIG. 1. For a restricted association scenario, the base station 110 may be the macro BS 110c in FIG. 1, and the UE 120 may be the UE 120y. The base station 110 may also be a base station of some other type. The base station 110 may be equipped with antennas 434a through 434t, and the UE 120 may be equipped with antennas 452a through 452r.

At the base station 110, a transmit processor 420 may receive data from a data source 412 and control information from a controller/processor 440. The control information may be for the Physical Broadcast Channel (PBCH), Physical Control Format Indicator Channel (PCFICH), Physical Hybrid ARQ Indicator Channel (PHICH), Physical Downlink Control Channel (PDCCH), etc. The data may be for the Physical Downlink Shared Channel (PDSCH), etc. The processor 420 may process (e.g., encode and symbol map) the data and control information to obtain data symbols and control symbols, respectively. The processor 420 may also generate reference symbols, e.g., for the PSS, SSS, and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator 432 may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DEMODs) 454a through 454r, respectively. Each demodulator 454 may condition (e.g., filter, amplify, downconvert, and digitize) a respective received signal to obtain input samples. Each demodulator 454 may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at the UE 120, a transmit processor 464 may receive and process data (e.g., for the Physical Uplink Shared Channel (PUSCH)) from a data source 462 and control information (e.g., for the Physical Uplink Control Channel (PUCCH) from the controller/processor 480. The transmit processor 464 may also generate reference symbols for a reference signal. The symbols from the transmit processor 464 may be precoded by a TX MIMO processor 466 if applicable, further processed by the demodulators 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the base station 110 may perform or direct, e.g., the execution of the functional blocks illustrated in FIGS. 11 and 12 and/or other processes for the techniques described herein and for those illustrated in the appended drawings. A scheduler 444 may schedule UEs for data transmission on the downlink and/or uplink.

Figure 5:
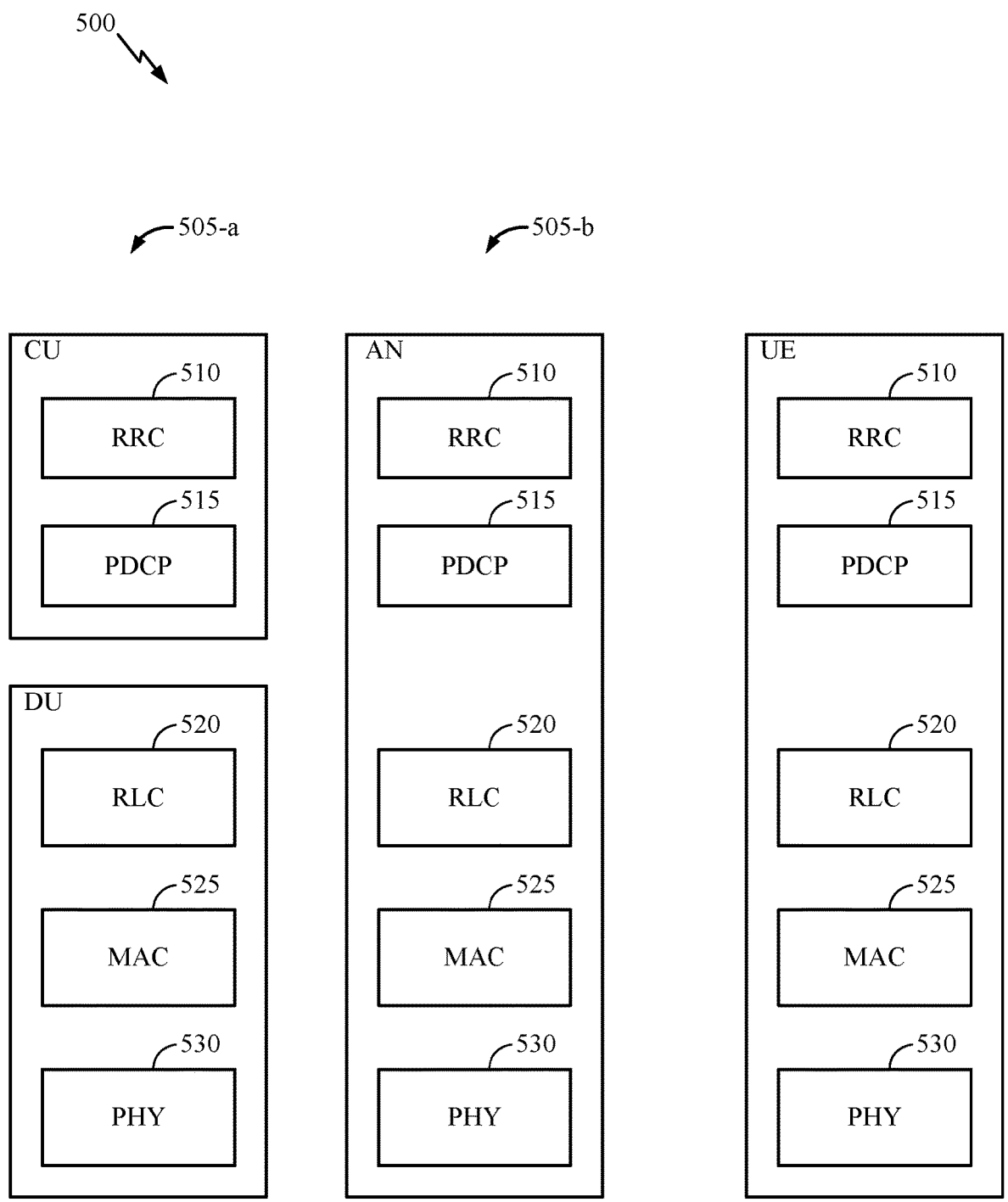
FIG. 5 is a diagram showing examples for implementing a communication protocol stack, in accordance with certain aspects of the present disclosure.

FIG. 5 illustrates a diagram 500 showing examples for implementing a communications protocol stack, according to aspects of the present disclosure. The illustrated communications protocol stacks may be implemented by devices operating in a in a 5G system. Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device (e.g., access node (AN), new radio base station (NR BS), a new radio Node-B (NR NB), a network node (NN), or the like.). In the second option, the RRC layer 510, the PDCP layer 515, the RLC layer 520, the MAC layer 525, and the PHY layer 530 may each be implemented by the AN. The second option 505-b may be useful in a femto cell deployment.

Regardless of whether a network access device implements part or all of a protocol stack, a UE may implement an entire protocol stack (e.g., the RRC layer 510, the PDCP layer 515, the RLC layer 520, the MAC layer 525, and the PHY layer 530).

Figure 6A:
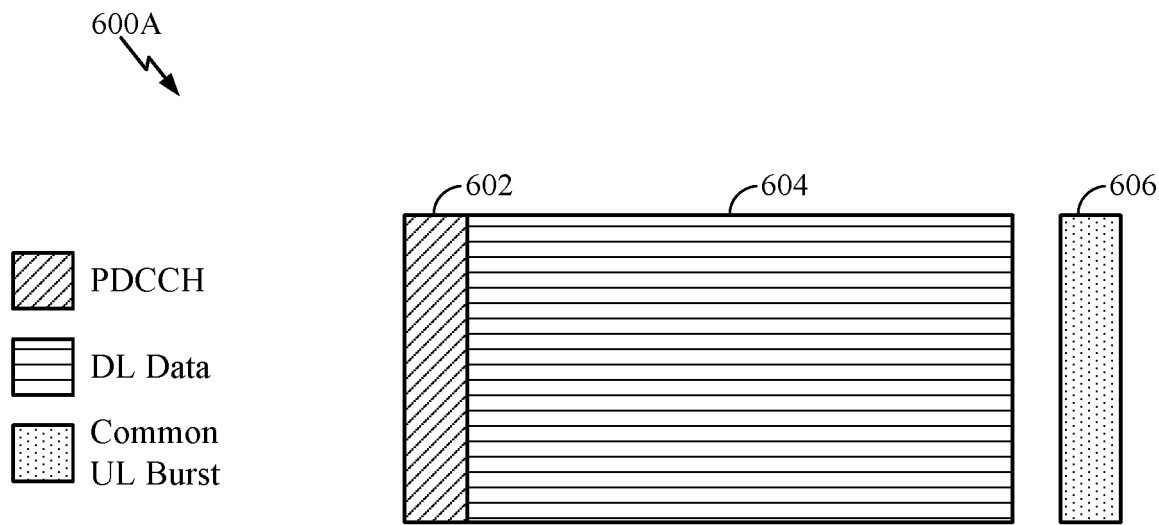
FIG. 6A illustrates an example of a DL-centric subframe, in accordance with certain aspects of the present disclosure.

FIG. 6A is a diagram 600A showing an example of a DL-centric subframe. The DL-centric subframe may include a control portion 602. The control portion 602 may exist in the initial or beginning portion of the DL-centric subframe. The control portion 602 may include various scheduling information and/or control information corresponding to various portions of the DL-centric subframe. In some configurations, the control portion 602 may be a physical DL control channel (PDCCH), as indicated in FIG. 6A. The DL-centric subframe may also include a DL data portion 604. The DL data portion 604 may sometimes be referred to as the payload of the DL-centric subframe. The DL data portion 604 may include the communication resources utilized to communicate DL data from the scheduling entity (e.g., UE or BS) to the subordinate entity (e.g., UE). In some configurations, the DL data portion 604 may be a physical DL shared channel (PDSCH).

The DL-centric subframe may also include a common UL portion 606. The common UL portion 606 may sometimes be referred to as an UL burst, a common UL burst, and/or various other suitable terms. The common UL portion 606 may include feedback information corresponding to various other portions of the DL-centric subframe. For example, the common UL portion 606 may include feedback information corresponding to the control portion 602. Non-limiting examples of feedback information may include an ACK signal, a NACK signal, a HARQ indicator, and/or various other suitable types of information. The common UL portion 606 may include additional or alternative information, such as information pertaining to random access channel (RACH) procedures, scheduling requests (SRs), and various other suitable types of information. As illustrated in FIG. 6, the end of the DL data portion 604 may be separated in time from the beginning of the common UL portion 606. This time separation may sometimes be referred to as a gap, a guard period, a guard interval, and/or various other suitable terms. This separation provides time for the switch-over from DL communication (e.g., reception operation by the subordinate entity (e.g., UE)) to UL communication (e.g., transmission by the subordinate entity (e.g., UE)). One of ordinary skill in the art will understand that the foregoing is merely one example of a DL-centric subframe and alternative structures having similar features may exist without necessarily deviating from the aspects described herein.

Figure 6B:
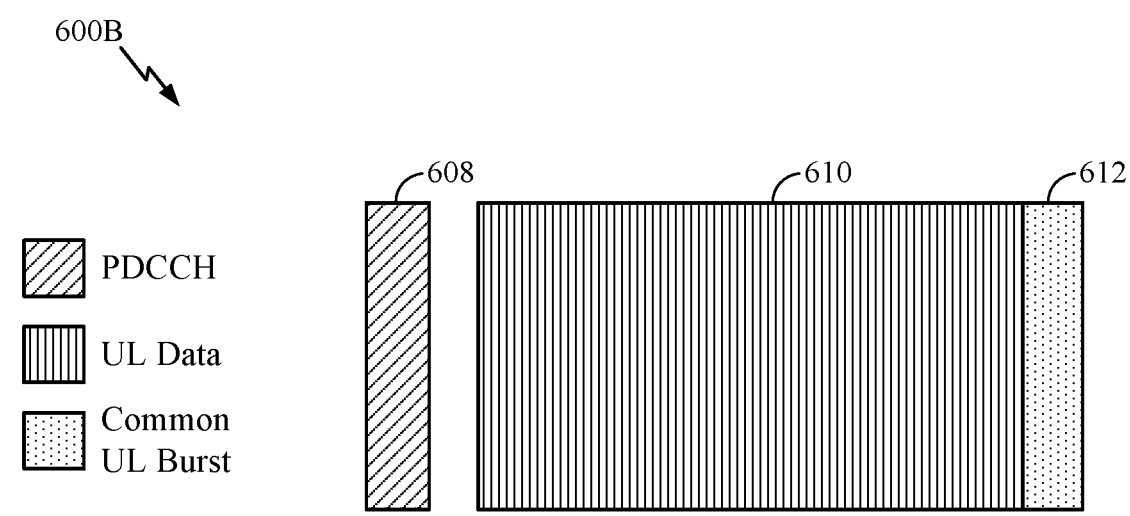
FIG. 6B illustrates an example of an UL-centric subframe, in accordance with certain aspects of the present disclosure.

FIG. 6B is a diagram 600B showing an example of an UL-centric subframe. The UL-centric subframe may include a control portion 608. The control portion 608 may exist in the initial or beginning portion of the UL-centric subframe. The control portion 608 in FIG. 6B may be similar to the control portion 602 described above with reference to FIG. 6A. The UL-centric subframe may also include an UL data portion 610. The UL data portion 610 may sometimes be referred to as the payload of the UL-centric subframe. The UL portion may refer to the communication resources utilized to communicate UL data from the subordinate entity (e.g., UE) to the scheduling entity (e.g., UE or BS). In some configurations, the control portion 608 may be a physical DL control channel (PDCCH).

As illustrated in FIG. 6B, the end of the control portion 608 may be separated in time from the beginning of the UL data portion 610. This time separation may sometimes be referred to as a gap, guard period, guard interval, and/or various other suitable terms. This separation provides time for the switch-over from DL communication (e.g., reception operation by the scheduling entity) to UL communication (e.g., transmission by the scheduling entity). The UL-centric subframe may also include a common UL portion 612. The common UL portion 612 in FIG. 6B may be similar to the common UL portion 606 described above with reference to FIG. 6A. The common UL portion 612 may additionally or alternatively include information pertaining to channel quality indicator (CQI), sounding reference signals (SRSs), and various other suitable types of information. One of ordinary skill in the art will understand that the foregoing is merely one example of an UL-centric subframe and alternative structures having similar features may exist without necessarily deviating from the aspects described herein.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an AN, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

CoMP

A UE may be located within the coverage area of multiple BSs. One of these BSs may be selected to serve the UE. The serving BS may be selected based on various criteria such as received signal strength, received signal quality, pathloss, etc. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

The wireless network may also support coverage may be enhanced by coordinated multipoint (CoMP) transmission. For CoMP, multiple transmission points (e.g., BSs or UEs) may coordinate to better serve a UE on a downlink or uplink. Transmission points may coordinate to reduce interference (e.g., with some transmission points restricting transmission during times others are to transmit). Multiple transmission points may also transmit simultaneously to achieve higher transmit power. Similarly, multiple transmission points may coordinate to serve a UE separately or simultaneously on the uplink.

CoMP may be supported via certain transmission modes. For example, in LTE Release 11, CoMP may be supported in DL transmission mode 10. In this case, a UE can be configured with multiple CSI processes, and may provide separate CSI feedback for each CSI process. Each CSI process may involve one non-zero-power (NZP) CSI-RS configuration used for channel measurement and one interference measurement resource (IMR) configuration (e.g., derived from zero-power (ZP) CSI-RS configuration) used for interference measurement.

Each CSI process may be viewed as being associated with one or more cells of the multiple cells involved in CoMP operation for the UE. A UE may also be dynamically indicated with a set of parameters for PDSCH rate matching and a NZP CSI-RS configuration for Quasi-co-location (QCL) operation (e.g., with DM-RS and/or CRS).

Figure 7:
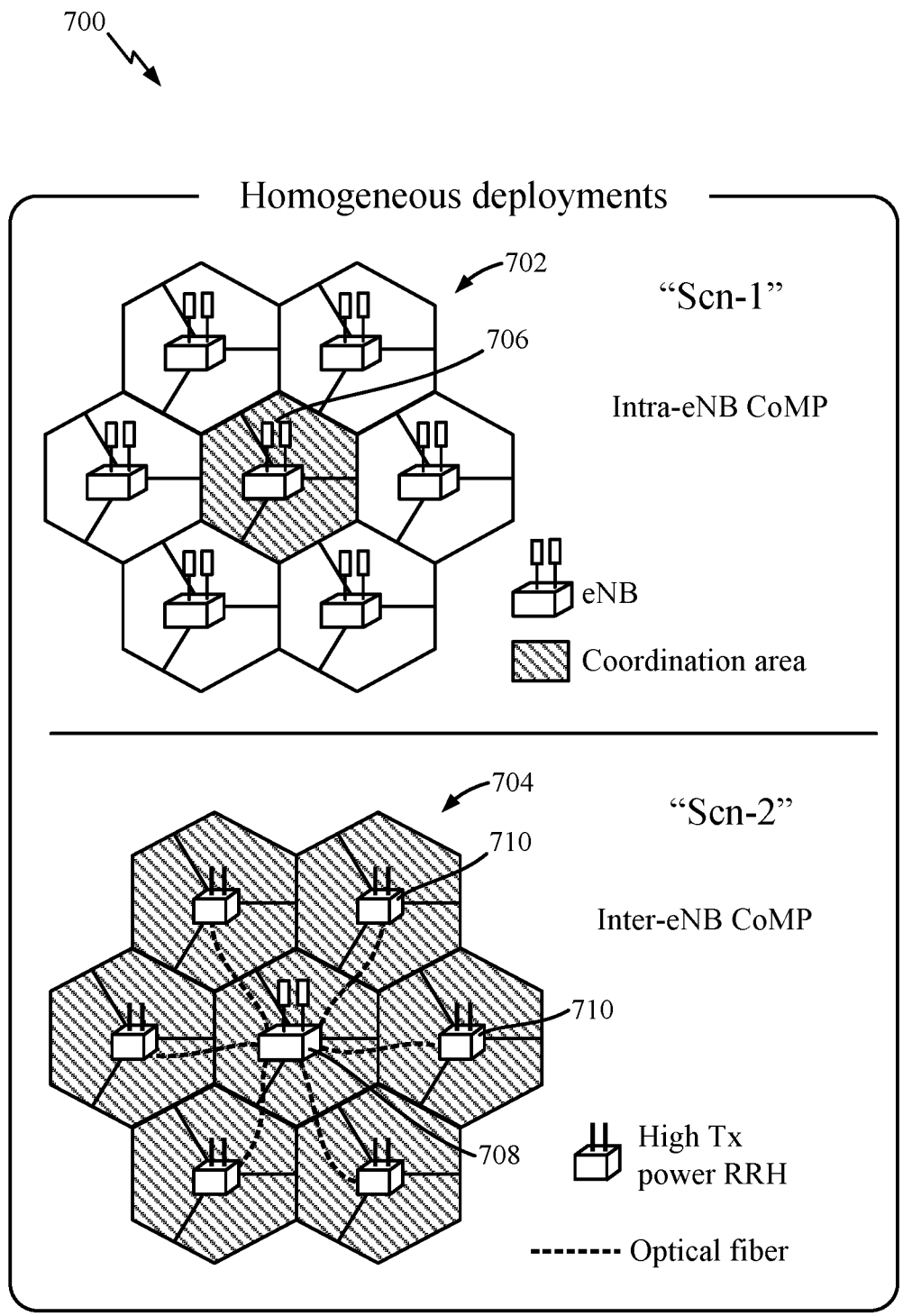
FIGS. 7 and 8 illustrate different CoMP deployment scenarios, according to aspects of the present disclosure.
Figure 8:
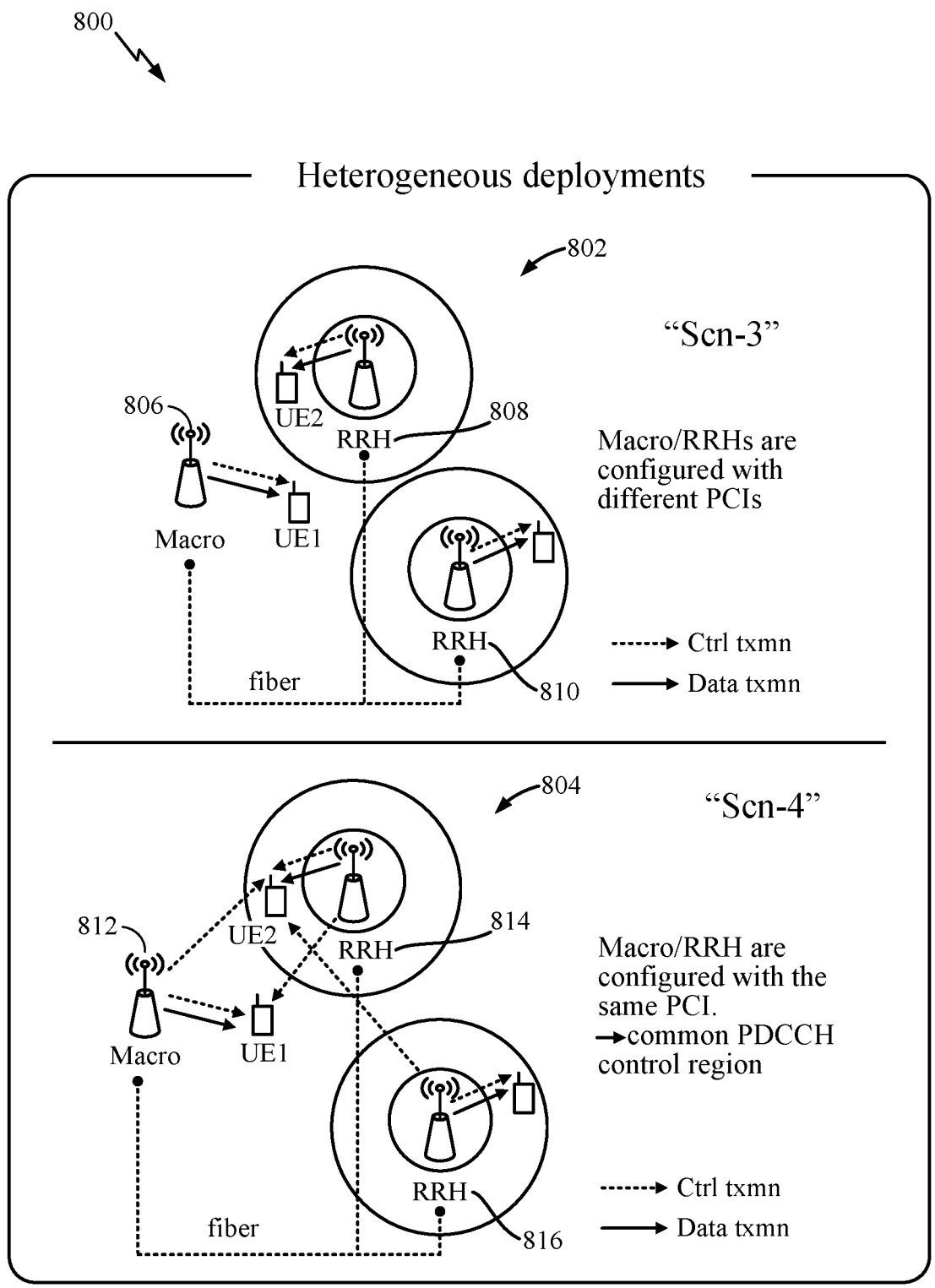

FIGS. 7 and 8 illustrate different CoMP deployment scenarios. As illustrated in FIG. 7, in homogeneous deployment examples 702 and 704, a group of transmission points of the same type (e.g., macro eNBs/BS) may be deployed to serve a UE. In the example 702, a single eNB/BS (e.g., eNB/BS 706) may serve the UE, wherein a plurality of eNBs/BSs may be connected through intra-eNB/BS CoMP. In the example 704, a plurality of eNBs/BSs may serve the UE simultaneously, wherein a macro eNB/BS 708 may be connected with high transmit (Tx) power remote radio heads (RRHs) 710 using optical fibers making the example system 704 inter-eNB/BS CoMP.

As illustrated in FIG. 8, in heterogeneous deployment examples 802 and 804, a group of transmission points (TPs) of different types (e.g., a macro eNB/BS and various RRHs)

may be deployed to serve a UE. As illustrated in the example 802, a macro eNB/BS 806 and RRHs 808 and 810 may be connected with a fiber for control and data transmissions. In the example 802, the macro eNB/BS 806 and the RRHs 808-810 may be configured with different physical cell identifiers (PCIs).

In the example 804, a Macro eNB/BS and RRHs may be configured with the same PCI resulting into a common PDCCH control region. Thus, for the example 804 of heterogeneous CoMP deployment, a Macro cell (e.g., defined by a Macro eNB/BS (812) and its associated small cells (e.g., defined by RRHs 814 and 816) may be configured with the same CRS. For certain aspects, two or more nonzero power (NZP) channel state information reference signals (CSI-RS) configurations (with a same or different virtual cell IDs) and two or more interference measurement resource (IMR) configurations may be used to differentiate different cells of the same CRS. A UE may designate CSI processes for feedback by a. UE, where each such CSI process includes both an interference measurement resource and a NZP-CSI-RS resource. Also, a UE may define interference measurement resources (IMR) to determine the amount of interference received from both coordinating cells and neighbor cells not a part of the CoMP coordinating set.

Example MCS and Rank Selection in CoMP

CoMP provides a framework for downlink and uplink cooperative transmissions involving multiple, non-collocated BSs. According to one example, CoMP may refer to a downlink strategy called joint processing, where multiple geographically separated BSs coordinate to create beams, wherein each beam may be transmitted from each of the multiple geographically separated BSs to serve a UE. Joint processing may involve centralized processing at a central BS and fiber connections to other coordinating BSs serving the UE. Joint processing may be thought of as a massive MIMO system with geographically distributed BSs.

Figure 9:
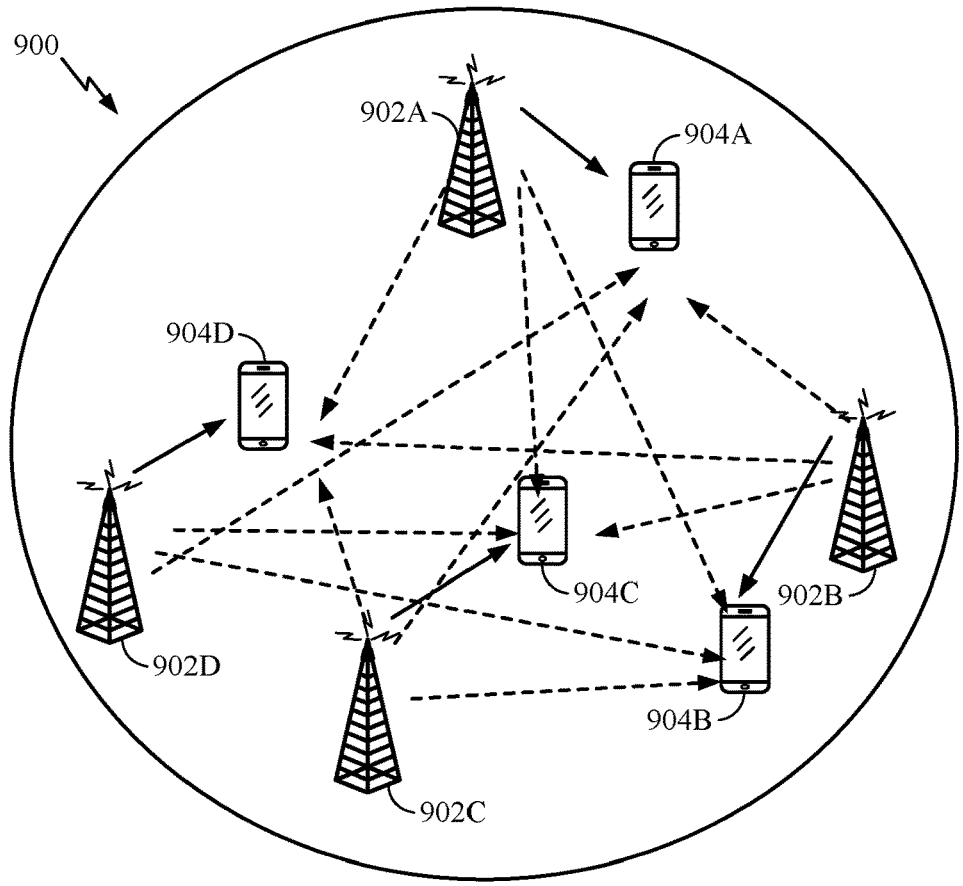
FIG. 9 is a diagram illustrating an example CoMP deployment architecture, according to aspects of the present disclosure.

FIG. 9 illustrates an example cluster of BSs 900 in accordance with aspects of the present disclosure. As illustrated, the cluster 900 may include four transmitters (e.g., BSs) 902A, 902B, 902C, and 902D and four receivers (e.g., UEs) 904A, 904B, 904C, and 904D. Each of the transmitters may jointly communicate with one or more UEs within the cluster.

A cluster of BSs serving a UE may be referred to as a serving cluster. A UE may experience interference from BSs that are part of another cluster (e.g., other than the UE's serving cluster). This cluster may be referred to as an interfering cluster. While not illustrated in FIG. 9, a particular UE may experience interference from one or more interfering clusters. BSs may take steps to avoid generating a significant interfering signal to a particular UE, such as by making the UE a zero-forcing (ZF) or signal-to-leakage ratio (SLR) target.

ZF beamforming may exploit knowledge of channels from a BS's antennas to choose a beamforming vector that maximizes energy while placing nulls in the direction of a non-targeted user. SLR may be used to select a beam to tradeoff maximum-ratio combining (MRC) gain towards an intended receiver versus interference caused to co-scheduled users. Trading off MRC gain towards an intended UE versus interference caused to a co-scheduled UE may be similar to the difference between a minimum mean square error (MMSE) receiver and a ZF receiver.

Figure 10:
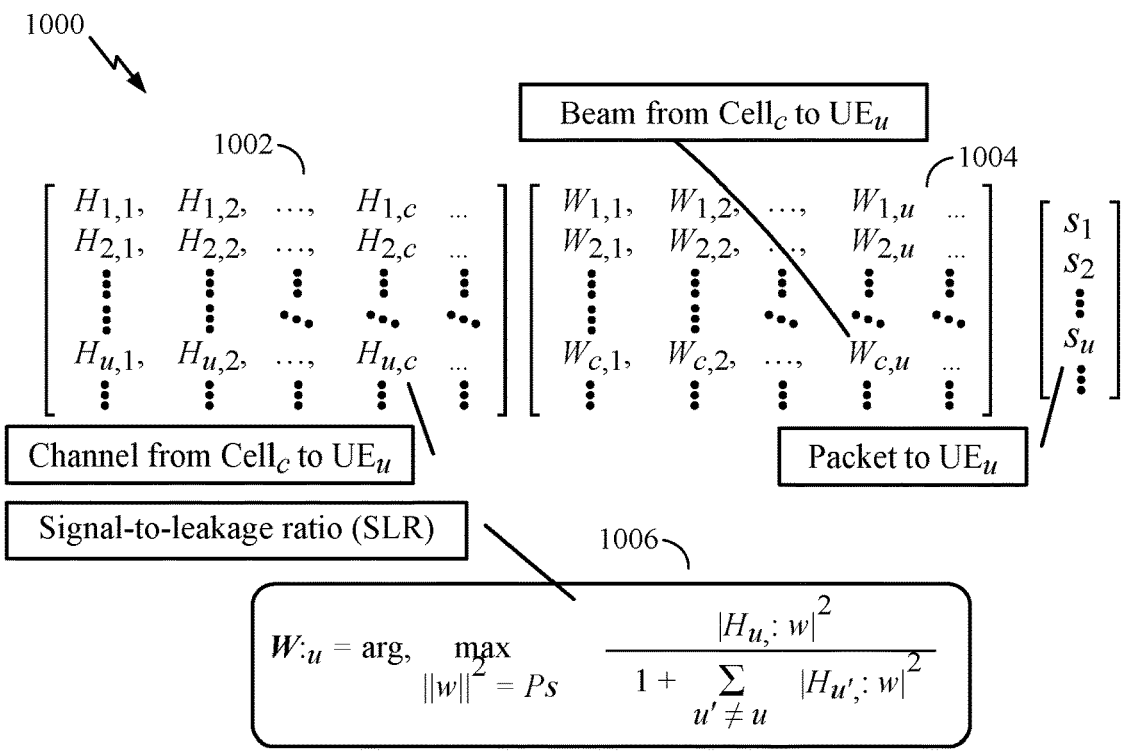
FIG. 10 illustrates an example channel matrix and matrix of beams/precoders, according to aspects of the present disclosure.

FIG. 10 illustrates an example 1000 of a channel matrix and precoder/beam matrix, according to aspects of the present disclosure. Referring back to FIG. 9, according to one example, each transmitter and receiver may have two antennas.

A channel matrix ("H matrix") for the cluster illustrated in FIG. 9 may be a 4×4 matrix as shown at 1002. Each entry in the channel matrix 1002 may be a 2×2 matrix when each transmitter has two antennas and each receiver has two antennas. Accordingly, $H_{1,1}$ may represent the channel from a BS in the cluster (such as a strongest BS) to a first UE. More generally, $H_{u,c}$ of the matrix 1002 may represent the channel from $Cell_c$ to $UE_u$.

After the channel matrix 1002 is known (e.g., computed) by a central entity for the BSs of the cluster, such as a scheduler, the central entity may determine a matrix of precoders/beams 1004 that may be used by BSs of the cluster while communicating with scheduled UEs. $W_{u,c}$ of the matrix 1004 may represent the beam or precoder from $Cell_c$ to $UE_u$.

With reference to FIG. 9, assuming four transmitters and four receivers, both the channel matrix 1002 and the matrix of beams/precoders 1004 may be a 4×4 matrix. Given a channel matrix 1002, the formula 1006 may be used by a scheduler to compute the matrix of beams/precoders 1004 for DL transmission. According to aspects, the formula 1006 may maximize the SLR for a scheduled UE. In the case of multiple receive antennas and/or MIMO streams, the receiver beams may be matched to the serving cell and SLR may be applied on a per-stream basis.

According to an example, the scheduler may determine which UEs to schedule. Thereafter, the scheduler may calculate the matrix of beam/precoders 1004 for the scheduled UEs. A scheduler for a cluster may decide to schedule less than all of the UEs in the cluster. With reference to FIG. 9, the scheduler may schedule less than the four illustrated UEs. FIG. 9 illustrates four UEs 904A, 904B, 904C, and 904D, a cluster may include a larger (or smaller) number of UEs. For example, the cluster may include 16 UEs, and the scheduler may determine which of the 16 UEs to schedule. The scheduler may determine which UEs to schedule based, at least in part, on a user priority (e.g., without knowledge of a beam/precoder matrix). According to aspects, knowledge of the channel statistics E[HH*] may be assumed to be known by the scheduler. E[HH*] may represent the channel covariance matrix.

After a scheduling decision is made, the scheduler may compute the beams/precoders for all scheduled UEs. Thus, after the scheduling decision is made, the beam/precoder matrix (e.g., the "W matrix" 1004) may be calculated. As described above, the channel matrix (e.g., the "H matrix" 1002) may be used to compute the beam/precoder matrix 1004 for the scheduled UEs. In TDD, beam computation may be preceded by a request to transmit a SRS for each of the scheduled UEs.

After the beams/precoders have been computed for the scheduled UEs of a cluster, the BSs may need to know at what rate each UE should be served using a given beam. For illustrative purposes, each beam may be thought of as a "pipe" from a respective BS of the cluster to a scheduled UE in the cluster. Aspects of the present disclosure provide techniques to determine the MCS and/or rank to use for transmitting data through the "pipe" to the UE. As described in more detail herein, with knowledge of beams/precoders to use for scheduled UEs, aspects of the present disclosure describe techniques for determining the MCS and/or rank to use while transmitting data using the determined beam/precoder.

As described above, after UE selection (e.g., user scheduling) and beam/precoder determination, the BS may need to select an appropriate MCS and/rank for each scheduled UE. In a CoMP cluster environment, a UE may experience intra-cluster interference and inter-cluster interference. Intra-cluster interference may refer to interference caused by BSs within the CoMP cluster serving the UE. Inter-cluster interference may refer to interference caused by transmissions outside of the UE's serving CoMP cluster. Intra-cluster interference may be due to the inaccuracy of channel estimates resulting in imperfect zero forcing. Based, at least in part, on the intra-cluster and inter-cluster interference experienced by a UE, a scheduler may determine a MCS and/or rank that may be used by BSs jointly communicating with the UE. A scheduler may communicate the selected MCS and/or rank to one or more BSs in the CoMP cluster for use in DL communication to a scheduled UE.

Figure 11:
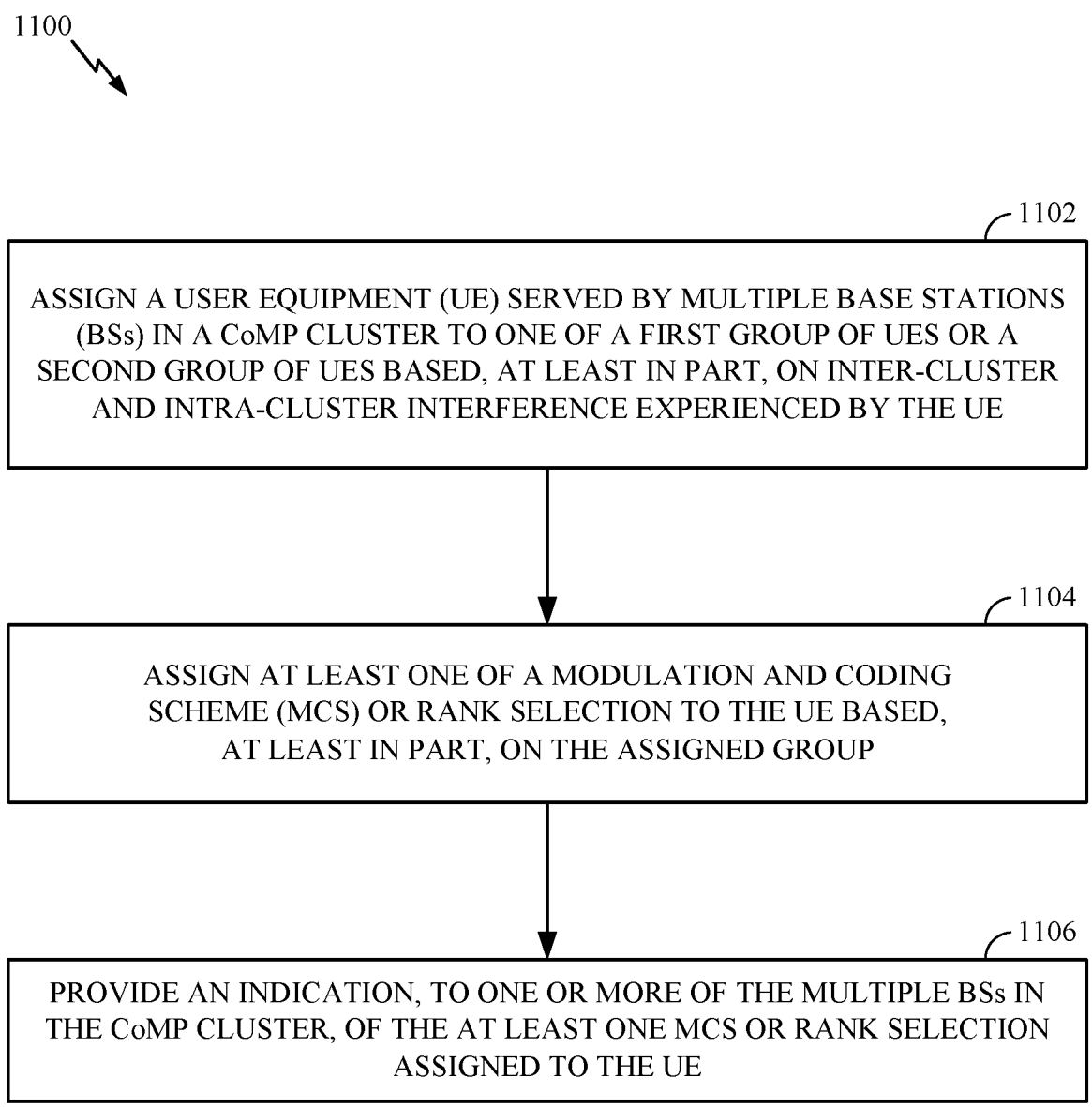
FIG. 11 is a flowchart illustrating example operations for wireless communications by a scheduler, according to aspects of the present disclosure.

FIG. 11 illustrates example operations 1100 which may be performed by a CoMP scheduler. The CoMP scheduler may be part of one or more BSs of a CoMP cluster or may be a separate entity in communication with one or more BSs of the cluster. In either case, the CoMP schedule may include one or more components such as those illustrated in FIG. 4. As an example, the CoMP scheduler may include one or more processors, transceivers (mod/demod), and antennas, in combination with a memory configured to store instructions thereon at the scheduler may be configured to perform the techniques described herein and the operations illustrated in FIG. 11 and FIG. 12.

At 1102, the scheduler may assign a UE served by multiple BSs in a CoMP cluster to one of a first group of UEs or a second group of UEs based, at least in part, on inter-cluster and intra-cluster interference experienced by the UE. At 1104, the scheduler may assign at least one of a MCS or rank selection to the UE based, at least in part, on the assigned group. At 1106, the scheduler may provide an indication, to one or more of the multiple BSs in the CoMP cluster, of the at least one MCS or rank selection assigned to the UE.

Figure 12:
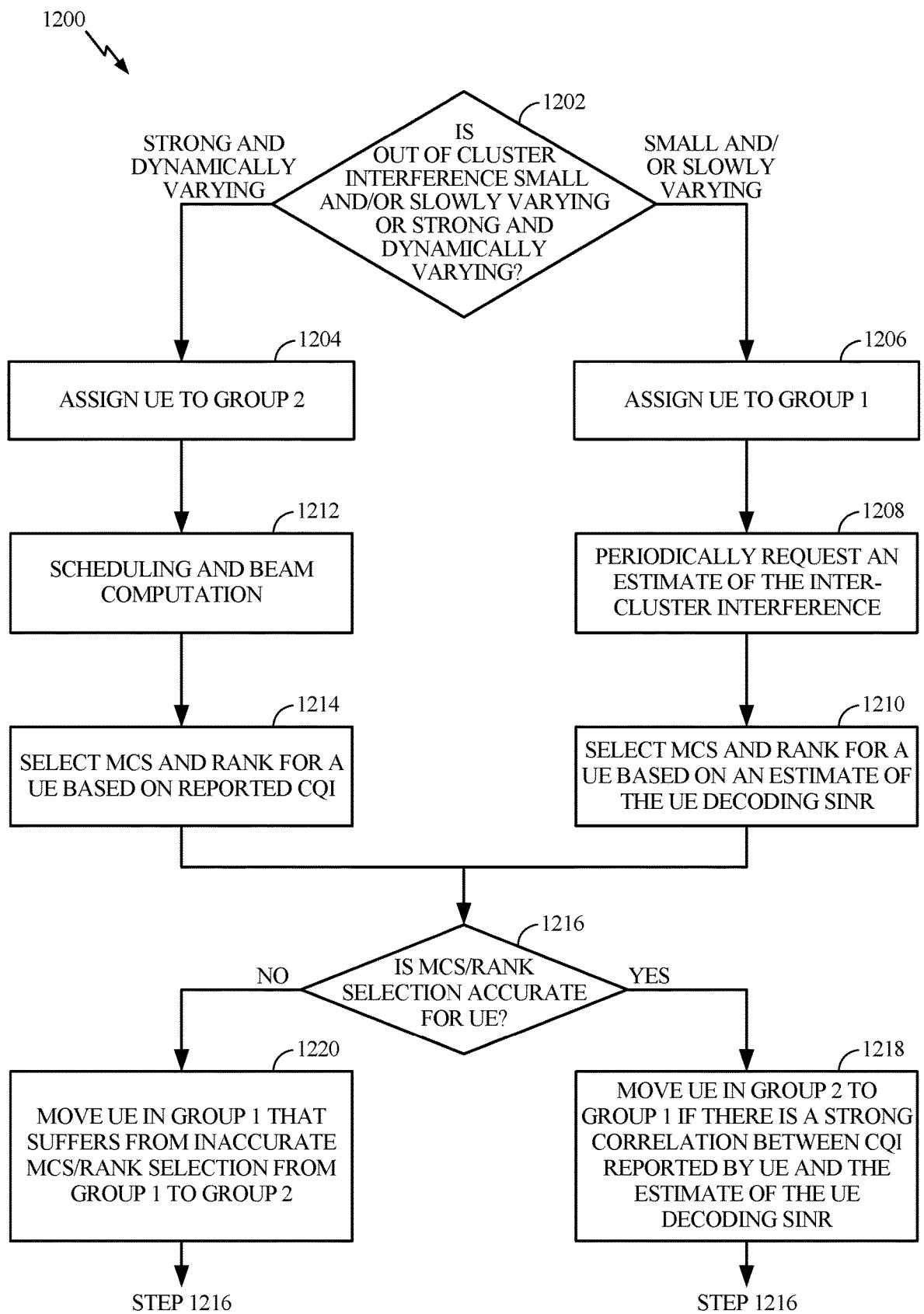
FIG. 12 is a flowchart illustrating example operations for wireless communications by a scheduler selecting MCS/rank using a hybrid method, according to aspects of the present disclosure.

FIG. 12 illustrates example operations 1200 which may be performed in accordance with aspects of the present disclosure. At 1202, the scheduler may partition the set of UEs to be scheduled into two groups. The first group may include the scheduled UEs for which the inter-cluster interference (e.g., out-of-cluster interference) is small and/or slowly varying. The second group may include the scheduled UEs for which the inter-cluster interference is strong and/or dynamically varying.

At 1206, a scheduled UE may be assigned to a first group when the out-of-cluster interference is small and/or slowly varying. UEs in Group 1 may experience a greater intra-cluster interference (within cluster) as compared to inter-cluster interference. The second group of UEs may include the scheduled UEs for which the inter-cluster interference is stronger and/or dynamically varying. UEs in Group 2 may experience a greater inter-cluster interference as compared to intra-cluster interference. At 1204, a scheduled UE may be assigned to Group 2 when the out-of-cluster interference is strong and/or dynamically varying. The inter-cluster interference may be classified as "strong" if it is stronger than the intra-cluster interference (e.g., within cluster interference).

As described above, UEs in Group 1 experience a stronger intra-cluster interference as compared to inter-cluster interference. Because the out-of-cluster interference is small and/or slowly varying for UEs in the first group, the scheduler may periodically, at 1208, request an estimate of the out-of-cluster interference experienced by the UE. As the UE in the first group may be experiencing stronger intra-cluster interference, the scheduler may also ignore the inter-cluster interference or periodically request the UEs to report the inter-cluster interference experienced. For UEs in the first group, the MCS and/or rank selection may be primarily based on the intra-cluster interference, which the scheduler may be able to estimate. Thus, at step 1210, the scheduler may select a MCS and/or rank for the UE based on an estimate of the UE's decoding signal-to-interference-plus-noise (SINR).

The estimate of inter-cluster interference reported by the UE (in response to step 1208) may be a scalar quantity and may not carry spatial information. The estimate may be based on the long term received power of the strongest cells outside the CoMP cluster that are observed by the UE. The scheduler may select a MCS and/or rank selection for a UE of the first group based one or more of precoders and channel estimates, an estimate of the intra-cluster interference computed by the scheduler based on channel estimates, and an estimate of inter-cluster interference reported by the UE.

UEs in the second group may experience stronger inter-cluster interference as compared to intra-cluster interference. A scheduler may not be able to determine or estimate the strong, out-of-cluster interference. Accordingly, at step 1212, the scheduler may schedule UEs and may calculate the beams/precoders for the scheduled UEs. Thereafter, the scheduler may request channel quality information (CQI) from the UE. The CQI may be a quantization of a received SINR ratio experienced by the UE. Using the reported CQI for one or more streams, the scheduler may, at step 1214, select a MCS and/or rank to be used by BSs in the cluster communicating with the UE.

As the out-of-cluster interference experienced by the UE may vary and because the scheduler may not be able to accurately estimate the out-of-cluster interference, the scheduler may periodically request a CQI update. In this manner, the scheduler may more accurately determine and timely update a MCS and/or rank for the scheduled UE.

As described above, a scheduled UE may be assigned to a first group or a second group based, at least in part, on whether the UE is experiencing stronger intra-cluster interference or inter-cluster interference. Selecting a MCS and/or rank for a UE experiencing stronger intra-cluster interference may be less complicated for the scheduler. For example, the scheduler of a cluster may estimate the interference experienced by the UE from other transmissions within the cluster without requiring feedback from the UE. On the other hand, selecting a MCS and/or rank for a UE experiencing stronger inter-cluster interference may be more complicated for the scheduler. Because the scheduler may not be able to accurately estimate the out-of-cluster interference experienced by the UE, the scheduler may use feedback from a UE to select a MCS and/or rank for the UE. Accordingly, assigning a UE to a correct group may save resources and may more accurately assign a MCS and/or rank selection to a scheduled UE.

According to aspects, the scheduler may reassign a UE from one group to another group. In this manner, membership to one of the first group or the second group is not static. At step 1216, the scheduler may determine if the MCS and/or rank for a scheduled UE is accurate. For example, for a UE assigned to the first group (e.g., experiencing stronger intra-cluster interference), the scheduler may use acknowledgements (e.g., ACK/NACK feedback) to estimate or determine whether the selected MCS and/or rank was accurate for the UE. If a UE transmits a relatively large number of NACKs (e.g., negative acknowledgments greater than a threshold value over a period of time), the scheduler may determine that the MCS/rank selection may be improved. A relatively large number of NACKs may indicate that the UE may be experiencing interference from another source, such as inter-cluster transmissions. Accordingly, the UE may be moved from the first group to the second group, as shown at step 1220.

As described above, it may be more complicated and resource-intensive for a scheduler to determine a MCS and/or rank for a UE assigned to the second group (e.g., experiencing stronger inter-cluster interference). For each UE in the second group, the scheduler may estimate the SINR experienced by the UE assuming the UE is assigned to the first group. The scheduler may compare this estimate with the CQI reported by the UE. If the two values are correlated, the scheduler may determine that it is able to accurately estimate the interference experienced by the UE. Accordingly, at step 1218, the UE may move the UE from the second group to the first group. On the other hand, and as described above, a UE in the first group may be moved to the second group, at step 1220, if it suffers from inaccurate MCS and/or rank.

In this manner, the scheduler may iteratively manage group membership in an effort to accurately assign a MCS and/or rank based on the interference experienced by the UE. Accordingly, after step 1218 or 1220, the scheduler may periodically evaluate (e.g., at step 1216) if the MCS and/or rank selection for a scheduled UE is accurate.

As described herein, aspects of the present disclosure provide techniques for selecting a MCS and/or rank to be used by multiple BSs jointly serving a UE in a CoMP cluster based on the dominance of intra-cluster interference or inter-cluster interference experienced by the UE. When the intra-cluster interference is dominant, the UE may be assigned to a first group and when the inter-cluster interference is dominant, the UE may be assigned to a second group. According to aspects, the scheduler may manage membership of the first and second group in an effort to efficiently and accurately assign MCS and/or rank to the UE.

As described herein, a scheduler may be part of a BS within a CoMP cluster or may be a separate entity configured to communicate with one or more of the BSs within the cluster. Regardless of the physical location, the scheduler may have visibility to information available to the BSs within the cluster.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining, estimating, and the like. Also, "determining" may include receiving (e.g., receiving information), accessing (e.g., accessing data in a memory) and the like. Also, "determining" may include resolving, selecting, choosing, establishing and the like.

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. As an example, one or more processors, transceivers (mod/demod), and antennas, in combination with a memory configured to store instructions thereon at the scheduler may be configured to perform the means and functions described herein. When the scheduler is part of a BS, the components such as the antenna 434, mod/demod 432, processors 430, 420, 438, and 440, and memory 442 may be configured to perform the techniques described herein for MCS and rank selection. For example, these components, either alone or in combination, may perform means for assigning, means for providing, means for transmitting, means for receiving, means for scheduling, means for requesting, means for reassigning, and means for calculating.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer-readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for determining a maximum available transmit power of the UE, instructions for semi-statically configuring a first minimum guaranteed power available for uplink transmission to a first base station and a second minimum guaranteed power available for uplink transmission to a second base station, and instructions for dynamically determining a first maximum transmit power available for uplink transmission to the first base station and a second maximum transmit power available for uplink transmission to the second base station based, at least in part, on the maximum available transmit power of the UE, the first minimum guaranteed power, and the second minimum guaranteed power.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a coordinated multipoint (CoMP) scheduler, comprising:
    assigning a user equipment (UE) served by multiple base stations (BSs) in a CoMP cluster to one of a first group of UEs or a second group of UEs based, at least in part, on a comparison of inter-cluster interference experienced by the UE to intra-cluster interference experienced by the UE, wherein the intra-cluster interference comprises interference experienced by the UE from BSs within the CoMP cluster serving the UE and the inter-cluster interference comprises interference experienced by the UE from transmissions outside of the CoMP cluster serving the UE;
    assigning at least one of a modulation and coding scheme (MCS) or rank selection to the UE based, at least in part, on the assigned group; and
    providing an indication, to one or more of the multiple BSs in the CoMP cluster, of the at least one MCS or rank selection assigned to the UE.

2. The method of claim 1, wherein the first group of UEs comprises one or more UEs experiencing stronger intra-cluster interference as compared to inter-cluster interference and the second group of UEs comprises one or more UEs experiencing stronger inter-cluster interference as compared to inter-cluster interference.

3. The method of claim 1, wherein the first group of UEs comprises one or more UEs for which inter-cluster interference is at least one of smaller or more slowly varying than inter-cluster interference experienced by one or more UEs assigned to the second group.

4. The method of claim 1, wherein assigning the UE comprises assigning the UE to the first group based on the inter-cluster interference being less than the intra-cluster interference, or to the second group based on the inter-cluster interference being greater than the intra-cluster interference.

5. The method of claim 1, wherein
    assigning the UE to one of the first group or the second group comprises assigning the UE to the first group; and
    assigning at least one of the MCS or rank selection to the UE is based, at least in part, on at least one of precoders and channel estimates for the UE, an estimate of the intra-cluster interference experienced by the UE computed by the CoMP scheduler, or an estimate of the inter-cluster interference reported by the UE.

6. The method of claim 5, further comprising:
    requesting, from the UE, the estimate of the inter-cluster interference experienced by the UE.

7. The method of claim 1, wherein:
    assigning the UE to one of the first group or the second group comprises assigning the UE to the second group; and
    assigning at least one of the MCS or rank selection to the UE is based, at least in part, on one or more channel quality indicators (CQI) received from the UE.

8. The method of claim 1, further comprising:
    receiving feedback, from the UE, in response to downlink transmissions from the multiple BS in the CoMP cluster using the assigned MCS or rank selection; and
    reassigning the UE from the first group to the second group or from the second group to the first group based, at least in part on the received feedback.

9. The method of claim 8, wherein the feedback comprises negative acknowledgements (NACKs) greater than a threshold value over a period of time.

10. The method of claim 1, further comprising:
receiving a channel quality indicator (CQI) from the UE assigned to the second group of UEs;
calculating, by the scheduler, an estimated CQI of the UE; and
reassigning the UE from the second group to the first group based, at least in part, on a correlation between the received CQI and the calculated CQI.

11. The method of claim 1, wherein the CoMP scheduler is part of a BS in the cluster.

12. An apparatus for wireless communication by a coordinated multipoint (CoMP) scheduler comprising:
at least one processor configured to:
assign a user equipment (UE) served by multiple base stations (BSs) in a CoMP cluster to one of a first group of UEs or a second group of UEs based, at least in part, on a comparison of inter-cluster interference experienced by the UE to intra-cluster interference experienced by the UE, wherein the intra-cluster interference comprises interference experienced by the UE from BSs within the CoMP cluster serving the UE and the inter-cluster interference comprises interference experienced by the UE from transmissions outside of the CoMP cluster serving the UE;
assign at least one of a modulation and coding scheme (MCS) or rank selection to the UE based, at least in part, on the assigned group; and
provide an indication, to one or more of the multiple BSs in the CoMP cluster, of the at least one MCS or rank selection assigned to the UE; and
a memory coupled to the at least one processor.

13. The apparatus of claim 12, wherein the first group of UEs comprises one or more UEs experiencing stronger intra-cluster interference as compared to inter-cluster interference and the second group of UEs comprises one or more UEs experiencing stronger inter-cluster interference as compared to inter-cluster interference.

14. The apparatus of claim 12, wherein the first group of UEs comprises one or more UEs for which inter-cluster interference is at least one of smaller or more slowly varying than inter-cluster interference experienced by one or more UEs assigned to the second group.

15. The apparatus of claim 12, wherein the at least one processor is configured to assign the UE by being configured to assign the UE to the first group based on the inter-cluster interference being less than the intra-cluster interference, or to the second group based on the inter-cluster interference being greater than the intra-cluster interference.

16. The apparatus of claim 12, wherein the at least one processor is configured to assign the UE to the first group; and
wherein the at least one processor is configured to assign at least one of the MCS or rank selection to the UE based, at least in part, on at least one of precoders and channel estimates for the UE, an estimate of the intra-cluster interference experienced by the UE computed by the CoMP scheduler, or an estimate of the inter-cluster interference reported by the UE.

17. The apparatus of claim 16, wherein the at least one processor is configured to:
request, from the UE, the estimate of the inter-cluster interference experienced by the UE.

18. The apparatus of claim 12, wherein the at least one processor is configured to assign the UE to the second group; and
wherein the at least one processor is configured to assign at least one of the MCS or rank selection to the UE based, at least in part, on one or more channel quality indicators (CQI) received from the UE.

19. The apparatus of claim 12, wherein the at least one processor is configured to:
receive feedback, from the UE, in response to downlink transmissions from the multiple BS in the CoMP cluster using the assigned MCS or rank selection; and
reassign the UE from the first group to the second group or from the second group to the first group based, at least in part on the received feedback.

20. The apparatus of claim 19, wherein the feedback comprises negative acknowledgements (NACKs) greater than a threshold value over a period of time.

21. The apparatus of claim 12, wherein the at least one processor is configured to:
receive a channel quality indicator (CQI) from the UE assigned to the second group of UEs;
calculate, by the scheduler, an estimated CQI of the UE; and
reassign the UE from the second group to the first group based, at least in part, on a correlation between the received CQI and the calculated CQI.

22. The apparatus of claim 12, wherein the CoMP scheduler is part of a BS in the cluster.

23. An apparatus for wireless communication by a coordinated multipoint (CoMP) scheduler, comprising:
means for assigning a user equipment (UE) served by multiple base stations (BSs) in a CoMP cluster to one of a first group of UEs or a second group of UEs based, at least in part, on a comparison of inter-cluster interference experienced by the UE to intra-cluster interference experienced by the UE, wherein the intra-cluster interference comprises interference experienced by the UE from BSs within the CoMP cluster serving the UE and the inter-cluster interference comprises interference experienced by the UE from transmissions outside of the CoMP cluster serving the UE;
means for assigning at least one of a modulation and coding scheme (MCS) or rank selection to the UE based, at least in part, on the assigned group; and
means providing an indication, to one or more of the multiple BSs in the CoMP cluster, of the at least one MCS or rank selection assigned to the UE.

24. The apparatus of claim 23, wherein the first group of UEs comprises one or more UEs experiencing stronger intra-cluster interference as compared to inter-cluster interference and the second group of UEs comprises one or more UEs experiencing stronger inter-cluster interference as compared to inter-cluster interference.

25. The apparatus of claim 23, wherein
the means for assigning the UE to one of the first group or the second group comprises means for assigning the UE to the first group; and
the means for assigning at least one of the MCS or rank selection to the UE is based, at least in part, on at least one of precoders and channel estimates for the UE, an estimate of the intra-cluster interference experienced by the UE computed by the CoMP scheduler, or an estimate of the inter-cluster interference reported by the UE.

26. The apparatus of claim 25, further comprising:
means for requesting, from the UE, the estimate of the inter-cluster interference experienced by the UE.

27. The apparatus of claim 23, wherein:
the means for assigning the UE to one of the first group or the second group comprises means for assigning the UE to the second group; and
the means for assigning at least one of the MCS or rank selection to the UE is based, at least in part, on one or more channel quality indicators (CQI) received from the UE.

28. The apparatus of claim 23, further comprising:
means for receiving feedback, from the UE, in response to downlink transmissions from the multiple BS in the CoMP cluster using the assigned MCS or rank selection; and
means for reassigning the UE from the first group to the second group or from the second group to the first group based, at least in part on the received feedback.

29. The apparatus of claim 23, further comprising:
means for receiving a channel quality indicator (CQI) from the UE assigned to the second group of UEs;
means for calculating, by the scheduler, an estimated CQI of the UE; and
means for reassigning the UE from the second group to the first group based, at least in part, on a correlation between the received CQI and the calculated CQI.

30. A non-transitory computer readable medium for wireless communication by a coordinated multipoint (CoMP) scheduler having instructions stored thereon for:
assigning a user equipment (UE) served by multiple base stations (BSs) in a CoMP cluster to one of a first group of UEs or a second group of UEs based, at least in part, on a comparison of inter-cluster interference experienced by the UE to intra-cluster interference experienced by the UE, wherein the intra-cluster interference comprises interference experienced by the UE from BSs within the CoMP cluster serving the UE and the inter-cluster interference comprises interference experienced by the UE from transmissions outside of the CoMP cluster serving the UE;
assigning at least one of a modulation and coding scheme (MCS) or rank selection to the UE based, at least in part, on the assigned group; and
providing an indication, to one or more of the multiple BSs in the CoMP cluster, of the at least one MCS or rank selection assigned to the UE.

* * * * *